United States Patent
Samayavel et al.

(10) Patent No.: US 11,683,295 B2
(45) Date of Patent: Jun. 20, 2023

(54) DATA AGGREGATION USING PROXY ENTRY OF CREDENTIALS

(71) Applicant: INTUIT INC., Mountain View, CA (US)

(72) Inventors: Muniyaraj Samayavel, Bangalore (IN); Prashant Asthana, Bangalore (IN)

(73) Assignee: INTUIT, INC., Mountain View, CA (US)

(*) Notice: Subject to any disclaimer, the term of this patent is extended or adjusted under 35 U.S.C. 154(b) by 15 days.

(21) Appl. No.: 16/859,153

(22) Filed: Apr. 27, 2020

(65) Prior Publication Data

US 2021/0036994 A1   Feb. 4, 2021

(30) Foreign Application Priority Data

Jul. 30, 2019  (IN) .............................. 201921030707

(51) Int. Cl.
| | | |
|---|---|---|
| *G06F 13/00* | (2006.01) | |
| *H04L 9/40* | (2022.01) | |
| *H04L 67/06* | (2022.01) | |
| *H04L 67/1097* | (2022.01) | |

(52) U.S. Cl.
CPC ...... *H04L 63/0281* (2013.01); *H04L 63/0435* (2013.01); *H04L 63/083* (2013.01); *H04L 63/102* (2013.01); *H04L 63/105* (2013.01); *H04L 67/06* (2013.01); *H04L 67/1097* (2013.01); *H04L 2463/082* (2013.01)

(58) Field of Classification Search
CPC ............ H04L 63/0281; H04L 63/0435; H04L 63/083; H04L 63/102; H04L 63/105; H04L 67/06; H04L 67/1097; H04L 2463/082; H04L 63/08

USPC ............ 709/201, 245, 203; 726/3, 5, 17–19
See application file for complete search history.

(56) References Cited

U.S. PATENT DOCUMENTS

| | | | | |
|---|---|---|---|---|
| 9,166,796 | B2* | 10/2015 | Albahdal | ................ H04L 9/088 |
| 9,613,190 | B2* | 4/2017 | Ford | ....................... G06F 21/62 |
| 9,762,553 | B2* | 9/2017 | Ford | ..................... G06F 21/602 |
| 9,887,990 | B2* | 2/2018 | Pranam | ............... H04L 63/0815 |
| 10,033,702 | B2* | 7/2018 | Ford | ..................... G06F 16/951 |
| 10,764,254 | B2* | 9/2020 | Ford | .................... H04W 12/02 |
| 10,789,373 | B2* | 9/2020 | Reid | ..................... H04L 9/3271 |

(Continued)

FOREIGN PATENT DOCUMENTS

WO   2015048349 A1   4/2015

OTHER PUBLICATIONS

PCT/US2020/030131, International Search Report/Written Opinion dated Sep. 15, 2020, 14 pages.

*Primary Examiner* — Kenneth R Coulter

(74) *Attorney, Agent, or Firm* — Patterson + Sheridan, LLP

(57) ABSTRACT

Certain aspects of the present disclosure provide techniques for entering user credentials through a proxy. One example method generally includes receiving, at a user device, a push request for user data from a cloud server and receiving a request file from an aggregation system. The method further includes injecting user credentials stored on the user device into the request file, wherein when injected the user credentials replace at least one dummy entry of the request file, and transmitting the request file to a data source associated with the request file. The method further includes receiving user data from the data source and transmitting the user data to the aggregation system.

20 Claims, 6 Drawing Sheets

(56) References Cited

U.S. PATENT DOCUMENTS

| | | |
|---|---|---|
| 2006/0185021 A1 | 8/2006 | Dujari et al. |
| 2014/0380040 A1* | 12/2014 | Albahdal ................ H04L 9/088 |
| | | 713/155 |
| 2015/0310188 A1* | 10/2015 | Ford .................. H04L 63/0428 |
| | | 726/28 |
| 2017/0041296 A1* | 2/2017 | Ford ..................... G06F 16/951 |
| 2017/0250979 A1 | 8/2017 | Benson et al. |
| 2017/0310659 A1 | 10/2017 | Pranam et al. |
| 2018/0232526 A1* | 8/2018 | Reid ..................... H04L 9/3271 |

* cited by examiner

DATA AGGREGATION USING PROXY ENTRY OF CREDENTIALS

CROSS-REFERENCE TO RELATED APPLICATIONS

This application claims benefit of Indian provisional patent application number 201921030707, filed Jul. 30, 2019, which is herein incorporated by reference.

INTRODUCTION

Aspects of the present disclosure relate generally to aggregating data from various sources.

In order to perform various tasks, for example, accounting or other financial tasks, for users in a client-server relationship, one may desire to collect user data from a large number of users. Collection of user data, especially sensitive financial data, may have many problems, however. For example, for certain kinds of data, a user associated with the data may need to provide credentials, such as a username and password, to a data source. To collect such data in the quantities needed to perform relevant tasks for the user, automation of data collection is required. However, users may be unwilling to provide credentials to a data collector to enable automation. Further, even if users agree to share credentials with a data collector, the data collector must thereafter take significant precautions to store the credentials safely, which can be prohibitively costly. Further still, data sources implementing Multi-Factor Authorization require additional input from users, preventing automation of such data sources using current data collection systems. Therefore, systems and methods are needed which allow a data collector to automate the collection of data accessed using user credentials, without obtaining or storing the user credentials.

BRIEF SUMMARY

Certain embodiments provide a system and a method for entering user credentials through a proxy. The method generally includes receiving, at a user device, a push request for user data from a cloud server and receiving a request file from an aggregation system. The method further includes injecting user credentials stored on the user device into the request file, wherein when injected the user credentials replace at least one dummy entry of the request file, and transmitting the request file to a data source associated with the request file. The method further includes receiving user data from the data source and transmitting the user data to the aggregation system.

Other embodiments provide a method for obtaining user data through a proxy service. The method generally includes transmitting a request for user data associated with a user device to a cloud server, wherein the cloud server is configured to transmit the request for the user data as a push request to the user device and receiving, from the user device, a request for a request file, wherein the request file is associated with a data source. The method further includes transmitting the request file to the user device, wherein the request file includes at least one dummy entry, in response to transmitting the request file, receiving user data associated with the user device from the user device and aggregating the user data with user data associated with at least one other user device.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
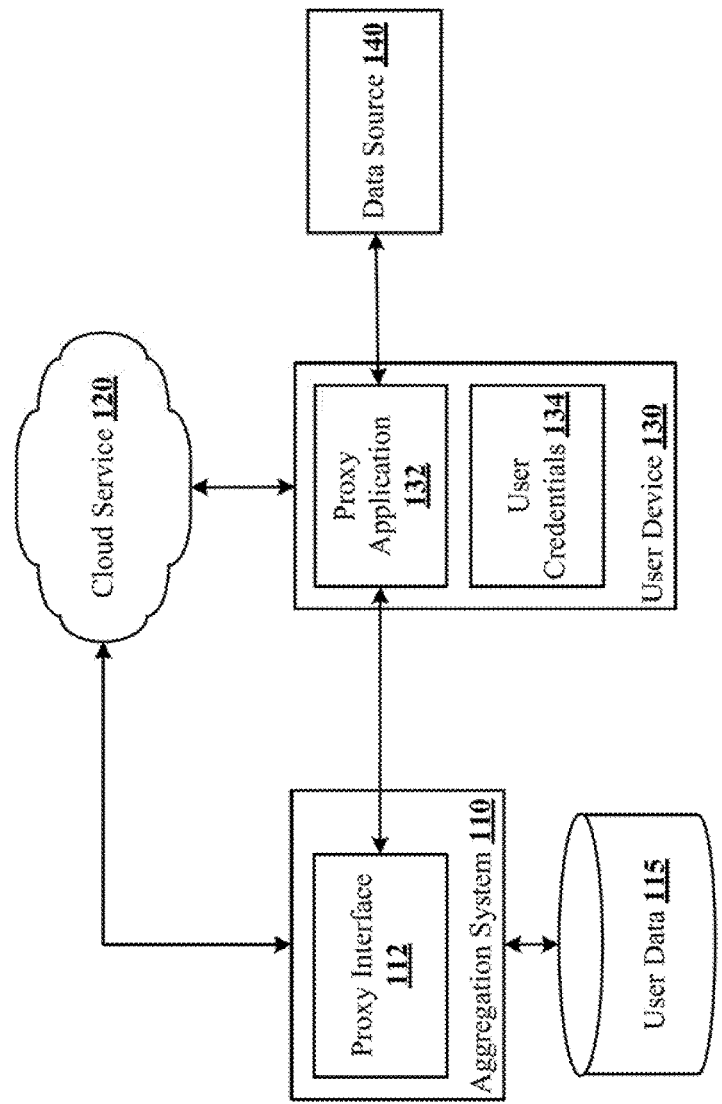
FIG. 1 depicts a computing environment for performing aggregation of data using proxy entry of credentials, according to one embodiment.

Aspects of the present disclosure provide apparatuses, methods, processing systems, and computer readable mediums for entering user credentials using a proxy service.

Current data collection techniques rely on obtaining and storing user credentials for each user whose data will be collected. However, these techniques have several shortcomings, including user unwillingness to share credentials and the cost of steps needed to ensure safety of stored credentials. Further, Multi-Factor Authentication (MFA) techniques frequently require manual intervention to proceed, limiting the ability to automatically collect data from data sources employing MFA techniques. Further still, some data sources may attempt to prevent Denial of Service (DoS) attacks by blocking multiple requests from a single source, and a data collector attempting to collect data may be blocked by DoS preventative measures.

To avoid the problems and limitations of existing data collection techniques, provided herein are systems and methods for entering user credentials to a data source using a proxy service. In particular, by using a proxy application executing on a user device, an aggregation system can make use of user credentials stored on the user device without directly storing the user credentials at the aggregation system. To do so, the aggregation system initiates a data transfer by using a cloud service to send a push notification to the user device.

In response to the push notification, the proxy application identifies one or more data sources corresponding to the push notification and requests, from the aggregation system, one request files that can be used to obtain data from the data sources. The proxy application can then inject the user credentials into a request file and transmit the request file to a data source, receiving the requested user data in response. The user data can then be encrypted and transmitted to the aggregation system, where the user data can be added to a repository of user data for later use.

For example, consider an aggregation system used to collect user financial data. Such a system may refresh stored data periodically, such as every day at a given time. To do so, the aggregation system may initiate push requests to a plurality of user devices, such as mobile devices simultaneously. A push request (or push notification) is a transmission from a server to a client initiated by the server rather than by the client. That is, a push request does not require a prior connection with a user device to be transmitted.

For a particular mobile device, the mobile device may determine to obtain, based on the push request, user data of a particular financial instruction available via a web server of the financial institution. To do so, the mobile device establishes a connection with the aggregation system and obtains from the aggregation system a HyperText Transfer Protocol (HTTP) request file formatted to be compatible with the web server. The mobile device then injects user credentials stored for a user of the mobile device into the HTTP request file and transmits the HTTP request file to the web server. Then, an HTTP response file from the web server may be received, which includes the requested user data. The mobile device then encrypts the HTTP response file and transmits the HTTP response file to the aggregation system, which can thereafter extract user data from the HTTP response file for storage.

Use of the methods and systems described herein has several advantages compared to existing data collection techniques. For example, using proxy entry of credentials obviates the need for an aggregation system to store user credentials, saving the cost of storage as well as insuring the safe storage of the user credentials. Further, using proxy entry of credentials allows for the automatic collection of data from data sources employing certain MFA techniques, expanding the number of data sources where collection can be automated. Further still, because requests for data originate from a plurality of user devices rather than from the aggregation system, using proxy entry of credentials allows for the automatic collection of data from data sources employing DoS attack prevention measures. Users also have greater control over data collection in a proxy system For example, in contrast with existing systems, users of a system using proxy entry of credentials may be able to change collection settings for their own data, such as by redacting certain information or altering collection times.

FIG. 1 depicts a computing environment 100 for aggregating user data using proxy entry of credentials. Computing environment 100 includes aggregation system 110, user data repository 115, cloud service 120, user device 130 and data source 140. For simplicity, a single user device and a single data source are shown, but in general, computing environments for aggregating user data may collect data from a plurality of data sources via a plurality of user devices.

Aggregation system 110 is a computing device including at least a processor and a memory (not shown). Aggregation system 110 is used to collect user data, such as from data source 140, from a plurality of users, and store the collected user data in user data repository 115. Although shown as a single device, in other examples aggregation system 110 may be a plurality of computing devices such as a cloud computing system or other distributed computing system.

Aggregation system 110 includes proxy interface 112, a module of aggregation system 110 used to communicate with user device 130. In other examples proxy interface 112 may be a separate device from aggregation system 110, such as a publically available server that can be accessed by user device 130. In such an example, proxy interface 112 may transmit messages from user device 130 to aggregation system 110, and messages from aggregation system 110 to user device 130.

Cloud service 120 is a service used to transmit push notifications to user devices, such as user device 130. For example, cloud service 120 may be a third party service such as Google CM®, iCloud Kit® or Amazon Web Services SNS®. Using such a service, aggregation system 110 can initiate a data request from user device 130 without first opening a channel of communication with user device 130. Aggregation system 110 may be capable of opening a channel of communication with user device 130 in some cases, although in many cases the networking and resource costs of simultaneously opening communication with a large number of user devices my be prohibitively expensive. For example, if aggregation system 110 aggregates data for several thousand user devices, it may be impractical for aggregation system 110 to simultaneously communicate with all user devices without significant upgrades to the components and bandwidth available to aggregation system 110. In general, aggregation system 110 may request for cloud service 120 to transmit push notifications to one or more user devices, including user device 130.

User device 130 is a computing device including a processor and memory (not shown). In some examples, user device 130 may be a cellular phone or other mobile device. User device 130 includes proxy application 132 and user credentials 134. Proxy application 132 is a software routine executing on user device 130 used to communicate with aggregation system 110 and data source 140. User credentials 134 are user credentials of a user of user device 130. In this example, proxy application 132 has previously received user credentials 134 from the user, although in other examples proxy application 132 may prompt the user for entry of user credentials upon determining that no user credentials are stored.

In general, upon receipt of a push notification from cloud service 120, proxy application 132 establishes communication with proxy interface 112. For example, communication between proxy application 132 and proxy interface 112 may take place over a persistent WebSocket connection or an HTTP 2 TCP SSL connection. Proxy application 132 then requests a request file associated with data source 140, allowing proxy application 132 to obtain user data from data source 140. Then, proxy application 132 injects user credentials 134 into the request file and transmits the request file to data source 140.

Data source 140 is a publically accessible computing device used to store user data for a plurality of users. For example, data source 140 may be a web server available via HTTP. Data source 140 may be available for users to navigate as a web site, that is, as a series of web pages with various entry fields and buttons for navigation, such as entry fields accepting one or more user credentials to access user data for a particular user. Navigation of data source 140 may be automated by analysis of HyperText Markup Language (HTML) pages of data source 140 to determine an HTTP request file that, when transmitted to data source 140, returns an HTTP response file including user data.

Upon receipt of the request file transmitted by proxy application 132, data source 140 returns an HTTP response file that includes the user data requested by aggregation system 110. Proxy application 132 then encrypts the response file and transmits the response file to proxy interface 112. Then, aggregation system 110 can extract the user data from the response file and store the user data within user data 115.

Figure 2:
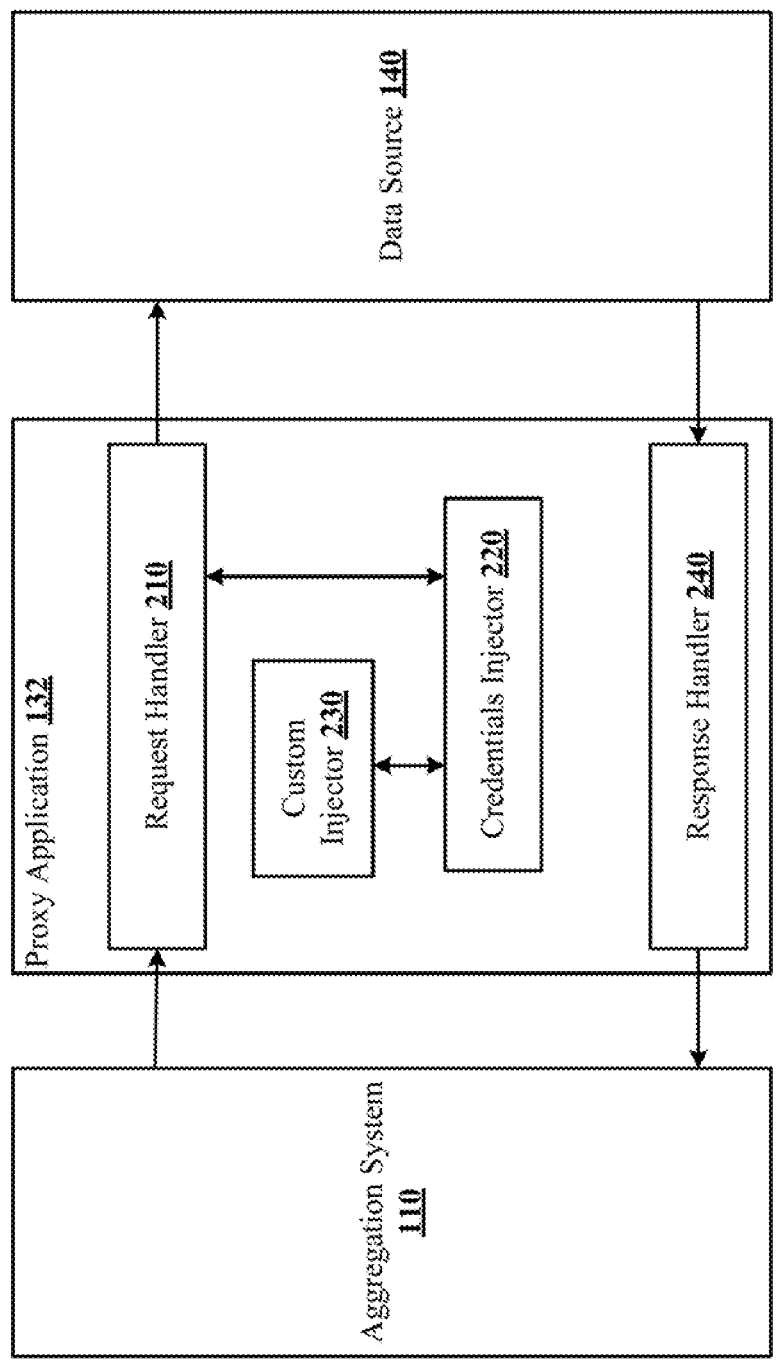
FIG. 2 is block diagram of a proxy application used to enter credentials according to an embodiment.

FIG. 2 is block diagram of proxy application 132 used to enter credentials. As shown, proxy application 132 includes request handler 210, credentials injector 220, custom injector 230 and response handler 240, which are subroutines of proxy application 132 used to perform various tasks.

As described above, proxy application 132 initiates communication with aggregation system 110, and receives a request file associated with data source 140. Proxy application 132 receives the request file via request handler 210. Request handler 210 listens on a communication channel of the user device (for example, a specified port for an HTTP connection) for receipt of the request file. Upon receipt, request handler 210 determines if the request file is a first communication file data source 140 for this session. If not, the request file likely includes a session cookie, and was encrypted by aggregation system 110 before transmission. In such a case, request handler 210 uses an encryption key associated with aggregation system 110 to decrypt the request file.

After any required decryption, request handler 210 passes the request file to credentials injector 220. Upon receipt, credentials injector 220 determines if the request file includes dummy credentials that need to be replaced. If so, credentials injector 220 determines if proxy application 132 has stored user credentials for data source 140. For example, if data source 140 is a website of a financial institution requiring a username and password for login, request handler 210 determines if proxy application 132 has stored a username and password for a user of the user device.

If credentials injector 220 determines there are not user credentials for data source 140, credentials injector 220 notifies proxy application 132 to prompt the user of the user device for user credentials, for example, this prompting may take place within a user interface of proxy application 132 displayed on a screen of the user device, including one or more entry boxes for the user credentials.

Credentials injector 220 identifies dummy credentials within the request file and replaces those dummy credentials with actual user credentials stored by proxy application 132. The dummy credentials may be any string of text within a request file standing in for actual credentials. For example, if the request file is a POST HTTP request, the request file received from aggregation system 110 may include various session cookies. Such cookies, when including dummy credentials, may include strings such as "user_login= DUMMYNAME" or "user_password=DUMMYPWORD."

As credentials injector 220 is aware of which dummy credentials are used by aggregations system 110, credentials injector 220 searches for dummy credentials within the request file to be replaced. Credentials injector 220, as stated, can replace these dummy credentials with the actual credentials. In the example above, this may include replacing the string "DUMMYNAME" with a stored username, and "DUMMYPWORD" with a stored user password. Thus, by, after decrypting the request file, searching through the plaintext of the request file credentials injector 220 can identify and replace dummy credentials with actual credentials. In other cases, dummy credentials may appear as input for FORM elements of HTML files or within many other types of transmission files.

In some cases, certain data sources may perform client-side encryption of credentials, especially passwords. In such cases, the injected credentials need to be encrypted with the encryption logic used by the data source before transmission of the request file. Custom injector 230 handles credentials encryption for such data sources. In general, after credentials injector 220 injects user credentials into the request file, credentials injector 220 passes the request file to custom injector 230. Custom injector 230 then searches the request file to identify the user credentials requiring encryption, and using the encryption key associated with the data source, replaces the user credentials with encrypted user credentials.

After the user credentials are injected into the request file, request handler 210 proceeds to transmit the request file to data source 140. Thereafter, after processing of the request file by data source 140, data source 140 returns a response file to proxy application 132. Response handler 240 receives the response file. In some cases, the response file includes user data requested by the aggregation system 110. In other cases, one or more additional request files may be transmitted to data source 140 before the user data is received, depending on the navigation flow of data source 140. In any case, response handler 240 encrypts the response file and transmits the encrypted response file to aggregation system 110.

Figure 3:
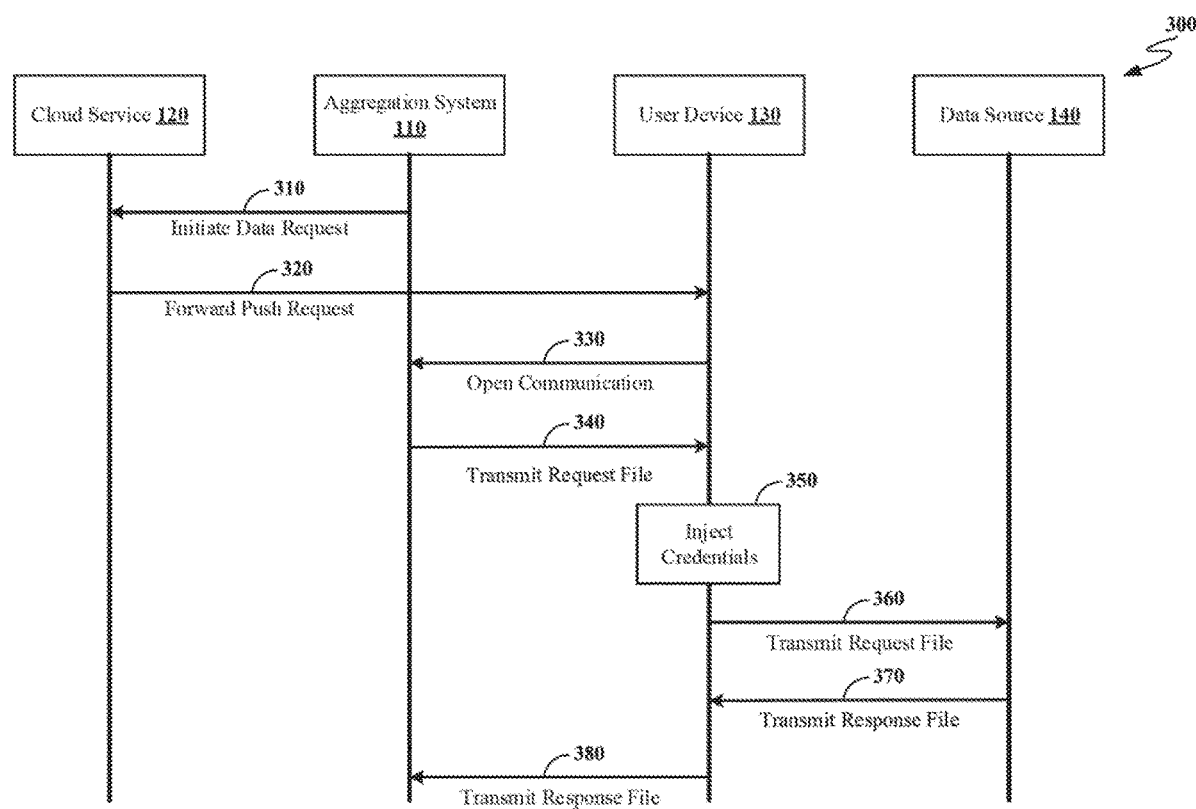
FIG. 3 is a call-flow diagram of an example method for performing aggregation of data using proxy entry of credentials.

FIG. 3 is a call-flow diagram of an example method 300 for performing aggregation of data using proxy entry of credentials. Method 300 is performed by aggregation system 110, cloud service 120, user device 130 and data source 140.

Method 300 begins at 310, where aggregation system 110 initiates a request for user data using cloud service 120. In general, the request for user data may be performed on a scheduled basis, such as every day at a particular time, weekly, etc. User of cloud service 120 allows aggregation system 110 to perform a system wide (e.g., with all associated user devices) data request without requiring a prior connection with each and every user device. After aggregation system 110 initiates the request, cloud service forwards the request for the user data to user device 130 as a push request, at 320. In general, cloud service 120 may forward a plurality of push requests to a plurality of other user devices simultaneously.

At 330, in response to the push request, user device 130, through a proxy application associated with aggregation system 110, opens communication with aggregation system 110. Then, aggregation system 110 transmits a request file associated with data source 140 at 340. In some cases, aggregation system 110 may further transmit a configuration file associated with data source 140. Such a configuration file may include details required for communication with data source 140, such as if data source 140 performs client-side encryption. The configuration file may also include a uniform resource locator (URL) associated with a login page of data source 140, identifiers of the type and number of credentials required by data source 140 and other identifying information of data source 140.

At 350, user device 130 injects stored credentials into the request file, replacing dummy credentials within the request file. Then, user device 130 transmits the request file with the injected credentials to data source 140 at 360. In general, the request file is transmitted to data source 140 in the same manner that a browser would transmit request files to data source 140. Thus, data source 140 responds to the request file in the same manner that data source 140 would respond to a request file from a user interacting with data source 140 via a web browser.

At 370, after processing the request file, data source 140 transmits a response file to user device 130. The response file may include the user data initially requested by aggregation system 110 at 310. After receipt of the response file, at 380, user device 130 transmits the response file to aggregation system 110. Thereafter, aggregation system 110 may extract user data from the response file, and store the user data in a database. In general, user device 130 may encrypt the response file prior to transmission to aggregation system 110.

Figure 4:
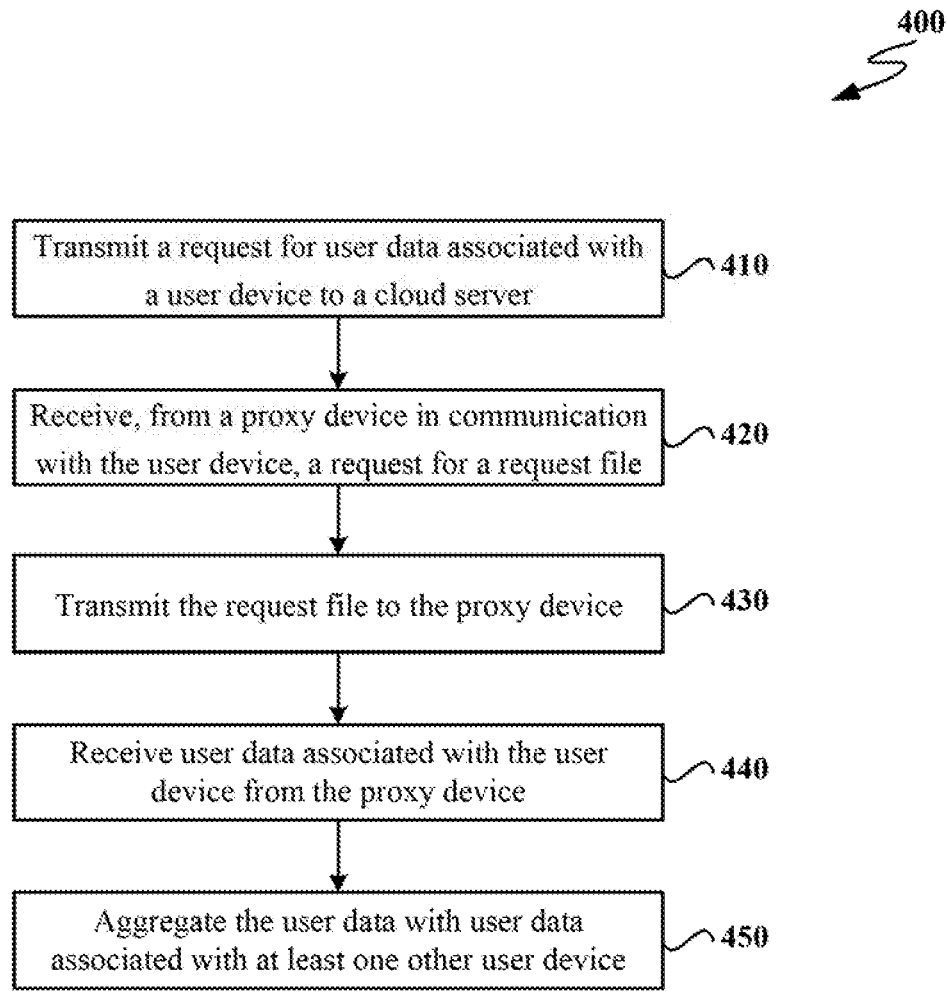
FIG. 4 is a flow chart of an example method for obtaining user data through a proxy service.

FIG. 4 is a flow chart of an example method 400 for obtaining user data through a proxy service. Method 400 may be performed by an aggregation system, such as aggregation system 110 of FIG. 1.

Method 400 begins at 410, where the aggregation system transmits a request for user data associated with a user device to a cloud server. The cloud server is configured to transmit the request for the user data as a push request to the user device. The cloud server may be a third party service as described above. In general, use of the cloud server may allow the aggregation system to request data from a large number of user devices simultaneously without overburdening the available network resources of the aggregation system.

At 420 the aggregation system receives, from the user device, a request for a request file, wherein the request file is associated with a data source. In general, the request for user data made by the aggregation system at 410 is interpreted by the user device to correspond to data stored with a particular data source. The user device thereafter requests from the aggregation system a request file used to communicate with the data source. The request file may have been previously prepared by one or more users of the aggregation system by analyzing request and response files from a typical communication with the data source, such as HTTP files from a communication between the data source and a browser.

At 430 the aggregation system transmits the request file to the user device, wherein the request file includes at least one dummy entry. As mentioned, the request file is configured to be used in communication with the data source. However, the request file typically requires one or more user credentials to communicate with the data source. The aggregation system does not have access to these user credentials, so instead, the aggregation system transmits a request file including dummy credentials with the request file where actual credentials may be injected by the user device.

At 440, the aggregation system receives user data associated with the user device from the user device. In general, the user device uses the request file transmitted at 440 to communicate with the data source, and receive user data from the data source. In some cases, the user data may be included within a response file transmitted by the data source. In either case, the user device encrypts the user data before transmission to the aggregation system, so the aggregation system typically decrypts the user data upon receipt.

At 450, the aggregation system aggregates the user data with user data associated with at least one other user device. In general, the aggregation system is used to store data for a large number of users in one database. When user data is received for a particular user, the aggregation system stores the user data within the database alongside the other data. The database may thereafter be used for a number of tasks, including calculating data summaries for individual users, or providing large scale tasks across the entire database, such as using the aggregated data for artificial intelligence or machine learning tasks.

In some examples of method 400, the data source is a server storing user data for a plurality of users available via HyperText Transfer Protocol (HTTP). In such examples, the user data is received within an HTTP response file. Further, in such examples in order to aggregate the user the aggregation system may perform the additional steps of: extracting the user data from within the HTTP response file; formatting the user data to a format supported by a user data repository; and storing the user data within the user data repository.

The aggregation system may additionally perform one or more machine learning tasks using the user data in some examples of method 400.

In certain examples of method 400 the aggregation system does not store user credentials associated with the user device, or any user credentials associated with any users. The aggregation system therefore does not need to provide additional security for stored user credentials.

Figure 5:
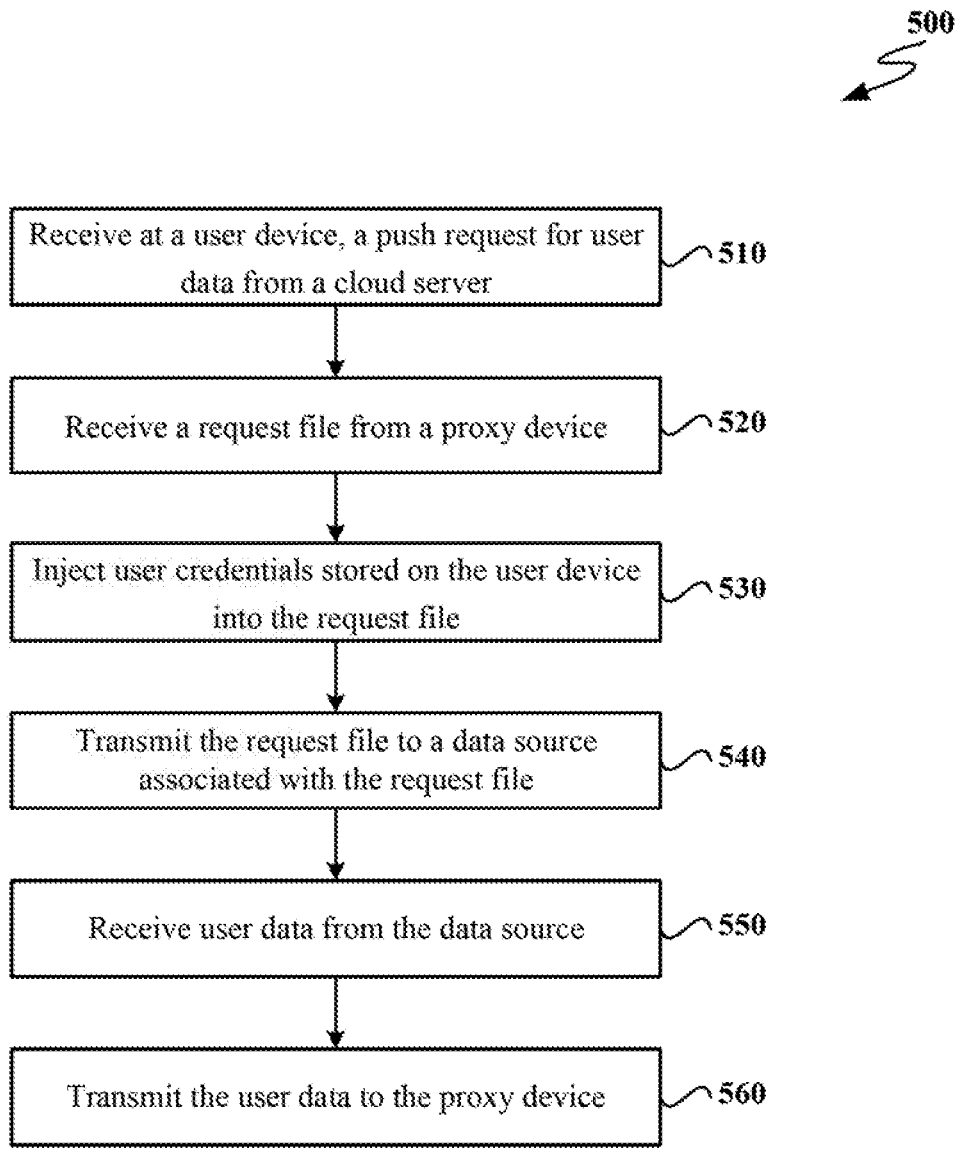
FIG. 5 is a flow chart of an example method for entering user credentials through a proxy.

FIG. 5 is a flow chart of an example method 500 for entering user credentials through a proxy. In some examples of method 500 may be performed by a user device such as user device 130 of FIG. 1.

Method 500 begins at 510, where the user device receives a push request for user data from a cloud server. In general, the push request is initiated by an aggregation system requesting user data, such as a refresh of stored data for a particular user, from the user device.

At 520 the user device receives a request file from the aggregation system. In general, the user device initiates communication with the aggregation system when receiving the push notification. The user device determines, based on the push notification, a data source to obtain the user data from, and requests a quest file from the aggregation system associated with the data source.

At 530 the user device injects user credentials stored on the user device into the request file, wherein when injected the user credentials replace at least one dummy entry of the request file. Because the aggregation system does not store user credentials, it relies on the user device to inject the user credentials into the request file. The user device may obtain the user credentials from a user of the user device at the time of injection, if the user credentials are not previously stored on the user device. If the user device has previously stored user credentials for the user and the data source, those stored user credentials are injected into the request file.

At 540 the user device transmits the request file to the data source associated with the request file. In some examples of method 500, the data source is a server storing user data for a plurality of users available via HyperText Transfer Protocol.

At 550 the user device receives the user data from the data source. In some cases the user data may be received as part of an HTTP response file. Generally, the user device does not attempt to extract the user data from the response file or analyze the user data, instead relying on the aggregation system to perform additional tasks with the user data.

At 560 the user device transmits the user data to the aggregation system. In some examples, prior to transmitting the user data to the aggregation system, the user device the user data, to ensure privacy of the user data while in transmitting. After receipt the aggregation system can aggregate the user data with a plurality of other data from other users in order to perform tasks with the aggregated data.

In some examples of method 500, the user device may additionally determine the data source has not previously been accessed by the user device; prompt a user of the user device for entry of the user credentials; and store the user credentials on the user device. These steps may be performed if the user device has not previously stored user credentials for the user. In some such examples, prior to storing the user credentials on the user device, the user device encrypts the user credentials.

In certain cases, the user device may determine, the data source uses client-side encryption, identify an encryption key associated with the data source and encrypt the user credentials within the request file using the encryption key.

In some cases, the data source may be configured to perform Multi-Factor Authentication (MFA). In such cases, the data source may perform additional steps to satisfy the MFA, such as determining a type of MFA used by the data source. For example, the user device may receive a configuration file of the data source from the aggregation system identifying the type of MFA. Then, the user device may prompt the user of the user device for additional input based on the type of MFA used by the data source. For example, one type of MFA may be to enter answers to security questions. In such examples the user device may prompt the user for the answers, and thereafter store the answers for use on subsequent data requests.

In some cases of method 500, the user device may determine the data source is configured to perform authentication via a one-time password. On possible implementation of one-time passwords is to send a passcode or password to the user via a separate channel, such as to a telephone of the user. In such cases, the user device may then read a short message service (SMS) message sent to the user device. This may be done if the user device is a cell phone or other mobile device capable of receiving SMS messages. After reading the SMS message, the user device transmits at least a portion of the SMS message to the data source. For example, the user device may identify the password or passcode within the SMS message and transmit the extracted password or passcode to the data source.

Figure 6:
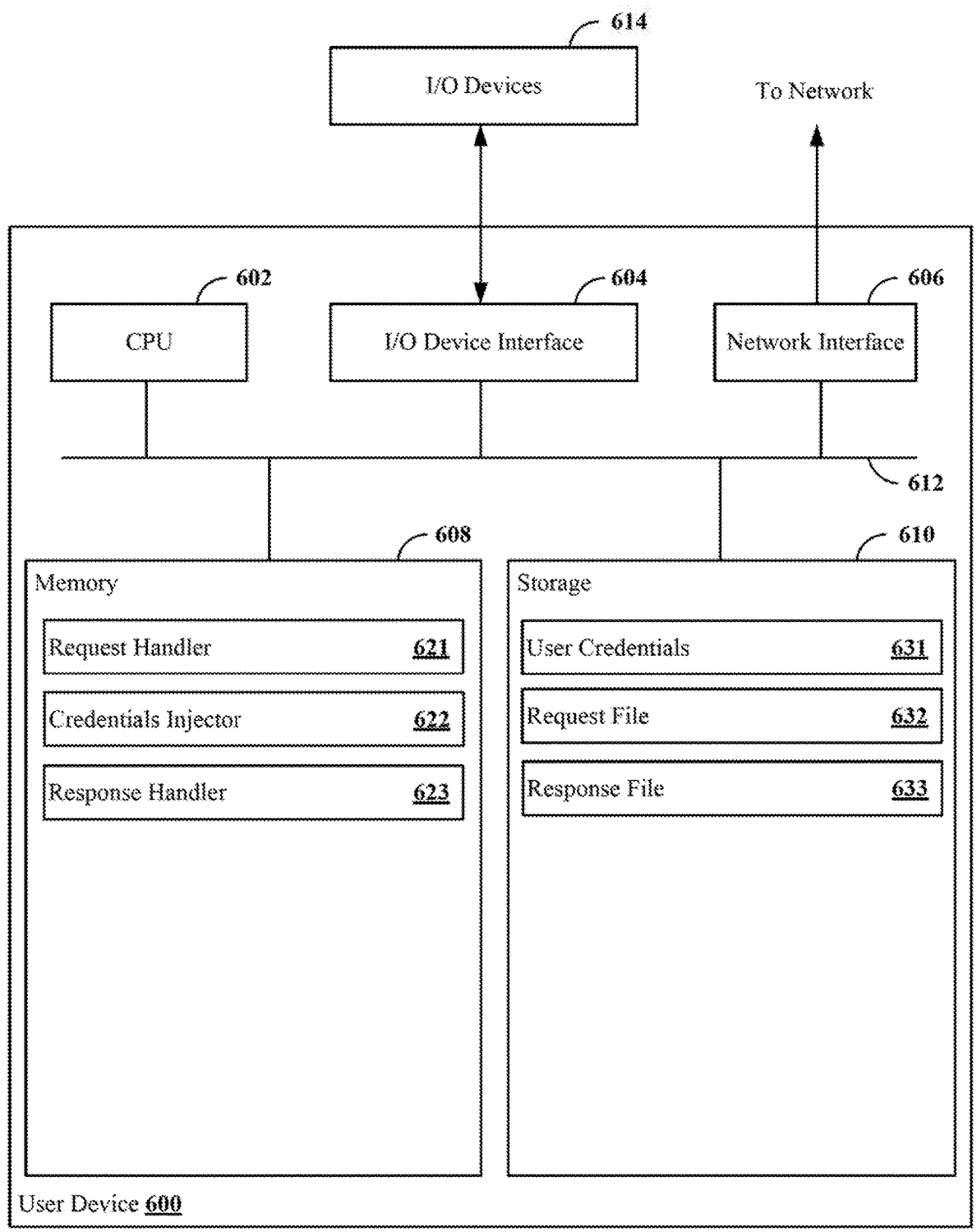
FIG. 6 is a block diagram of example user device, according to one embodiment.

FIG. 6 is a block diagram of example user device 600, according to one embodiment. As shown, the machine learning device 600 includes, without limitation, a central processing unit (CPU) 602, one or more input/output (I/O) device interfaces 604, which may allow for the connection of various I/O devices 614 (e.g., keyboards, displays, mouse devices, pen input, etc.) to machine learning device 600, network interface 606, memory 608, storage 610, and an interconnect 612.

The CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610. The CPU 602 is included to be representative of a single CPU, multiple CPUs, a single CPU having multiple processing cores, and the like. The I/O device interface 604 may provide an interface for capturing data from one or more input devices integrated into or connected to the machine learning device 600, such as keyboards, mice, touchscreens, and so on. The memory 608 may represent a random access memory (RAM), while the storage 610 may be a solid state drive, for example. Although shown as a single unit, the storage 610 may be a combination of fixed and/or removable storage devices, such as fixed drives, removable memory cards, network attached storage (NAS), or cloud-based storage.

As shown, the memory 608 includes request handler 621, credentials injector 622 and response handler 623, which are software routines of user device 600. Request handler 621, credentials injector 622 and response handler 623 may execute based on programming code stored within storage 610

As shown, the storage 610 includes user credentials 631, request file 632 and response file 633. In general, user device 600 obtains user credentials 631 from a user of user device 600. User credentials 631 are associated with both the user and a data source. Thereafter, user device 600 receives request file 631 via request handler 621. Then, credentials injector 631 injects user credentials 631 into request file 632, replacing dummy entries of request file 632. After injection, request handler 621 transmits request file 632 to the data source, such as via network interface 606. Then, in response to request file 632, user device receives, via response handler 623, response file 633. Response file 633 includes user data of the user. Then, response handler 623 encrypts response file 633 and transmits response file 633 to an aggregation system.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other circuit elements that are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
    receiving, at a proxy service on a user device from a proxy interface of an aggregation system separate from the user device, a request to obtain user data from a remote data source separate from the user device;
    receiving, by the proxy service, request data having at least one dummy entry from the proxy interface of the aggregation system;
    injecting, by the proxy service, user credentials stored on the user device into the request data, wherein, when injected, the user credentials cause the at least one dummy entry of the request data to be replaced;
    transmitting, by the proxy service, the request data, including the user credentials, to the remote data source;
    receiving, by the proxy service, the user data from the remote data source; and
    transmitting, by the proxy service, the user data to the proxy interface of the aggregation system.

2. The method of claim 1, further comprising:
    determining the remote data source has not previously been accessed by the user device;
    prompting a user of the user device for entry of the user credentials;
    encrypting the user credentials; and
    storing the user credentials on the user device.

3. The method of claim 2, further comprising:
    receiving, from the user, updated credentials;
    determining the updated credentials are of a same type as the user credentials;
    storing the updated credentials on the user device; and
    removing the user credentials from the user device.

4. The method of claim 1, further comprising:
    receiving, by the proxy service, a second request for second user data, wherein the second request for the second user data is associated with a second remote data source;
    injecting, by the proxy service, second user credentials associated with the second remote data source into second request data associated with the second remote data source, wherein the second user credentials are stored on the user device; and
    transmitting, by the proxy service, the second request data associated with the second remote data source to the second remote data source.

5. The method of claim 1, wherein injecting the user credentials stored on the user device into the request data further comprises:
    determining the remote data source uses client-side encryption;
    identifying an encryption key associated with the remote data source; and
    encrypting the user credentials within the request data using the encryption key.

6. The method of claim 1, wherein the remote data source is configured to perform Multi-Factor Authentication (MFA), wherein the method further comprises:
    determining a type of MFA used by the remote data source; and
    prompting a user of the user device for additional input based on the type of MFA used by the remote data source.

7. The method of claim 1, further comprising:
    determining the remote data source is configured to perform authentication via a one-time password;
    reading a short message service (SMS) message sent to the user device; and
    transmitting at least a portion of the SMS message to the remote data source.

8. The method of claim 1, wherein the user data is received as plaintext cookies, wherein the method further comprises, prior to transmitting the user data to the aggregation system, encrypting the user data from plaintext cookies to encrypted cookies.

9. The method of claim 1, wherein the remote data source is a server storing corresponding user data for a plurality of users available via HyperText Transfer Protocol.

10. The method of claim 1, wherein the aggregation system comprises a cloud server configured to transmit push requests, wherein the request for the user data is a push request.

11. A user device including:
    a processor; and
    a memory including computer readable instructions, wherein the processor is configured to, based on execution of the computer readable instructions:
        receive, at a proxy service on the user device, from a proxy interface of an aggregation system separate from the user device, a request to obtain user data from a remote data source separate from the user device;
        receive, by the proxy service, request data having at least one dummy entry from the proxy interface of the aggregation system;
        inject, by the proxy service, user credentials stored on the user device into the request data, wherein, when injected, the user credentials cause the at least one dummy entry of the request data to be replaced;
        transmit, by the proxy service, the request data, including the user credentials to the remote data source;
        receive, by the proxy service, the user data from the remote data source; and
        transmit, by the proxy service, the user data to the proxy interface of the aggregation system.

12. A method comprising:
    transmitting, by a proxy interface of an aggregation system, to a proxy service on a user device separate from the aggregation system, a request to obtain user data from a remote data source separate from the user device;
    receiving, by the proxy interface of the aggregation system, from the proxy service, a request for request data, wherein the request data is associated with the remote data source;
    transmitting, by the proxy interface of the aggregation system the request data to the proxy service, wherein the request data includes at least one dummy entry corresponding to user credentials stored on the user device;
    in response to transmitting the request data, receiving, by the proxy interlace of the aggregation system, the user data from the proxy service; and
    aggregating, by the aggregation system, the user data with additional user data associated with at least one other user device.

13. The method of claim 12, wherein the request for the user data associated with the user device is transmitted via a cloud server, wherein the cloud server is configured to transmit the request for the user data as a push request to the user device.

14. The method of claim 12, further comprising, prior to transmitting the request to obtain the user data:
    opening, by the aggregation system, a communication channel with the remote data source;
    receiving, by the aggregation system, an initial response from the remote data source;
    identifying, by the aggregation system, at least one credential request within the initial response;
    generating, by the aggregation system, based on the initial response, the request data, wherein the request data is configured to operate as a reply to the initial response, wherein the request data includes the at least one dummy entry; and
    storing, by the aggregation system, the request data.

15. The method of claim 12, wherein the remote data source is a server storing corresponding user data for a plurality of users available via HyperText Transfer Protocol (HTTP).

16. The method of claim 15, wherein the user data is received within an HTTP response file, wherein aggregating the user data comprises:
    extracting the user data from within the HTTP response file;

formatting the user data to a format supported by a user data repository; and storing the user data within the user data repository.

17. The method of claim 16, further comprising:

receiving, by the proxy interface of the aggregation system, an additional response file from the user device, wherein the additional response file is associated with a second data source;

extracting, by the aggregation system, respective user data from the additional response file;

formatting, by the aggregation system, the respective user data into a format supported by a user data repository; and storing the respective user data with the user data within the user data repository.

18. The method of claim 17, further comprising:

receiving, by the proxy interface of the aggregation system, a plurality of other response files from a plurality of other user devices, wherein the plurality of other response files are associated with one or more additional data sources;

extracting, by the aggregation system, at least one set of user data from the plurality of other response files;

formatting, by the aggregation system, the at least one set of user data into the format supported by the user data repository; and storing, by the aggregation system, the at least one set of user data within the user data repository, wherein certain user data is stored in the user data repository organized by an associated user account.

19. The method of claim 18, further comprising performing one or more machine learning tasks using the user data, wherein the one or more machine learning tasks include:

providing the user data as training data to a machine learning model; and providing the user data as verification data to the machine learning model.

20. The method of claim 17, wherein the proxy service does not store the user credentials.

* * * * *